Sept. 29, 1942.                A. S. THOMPSON                2,297,176
                        COMBINED AUTOMOBILE CHAIR AND BED
                            Filed Aug. 4, 1941            3 Sheets-Sheet 1
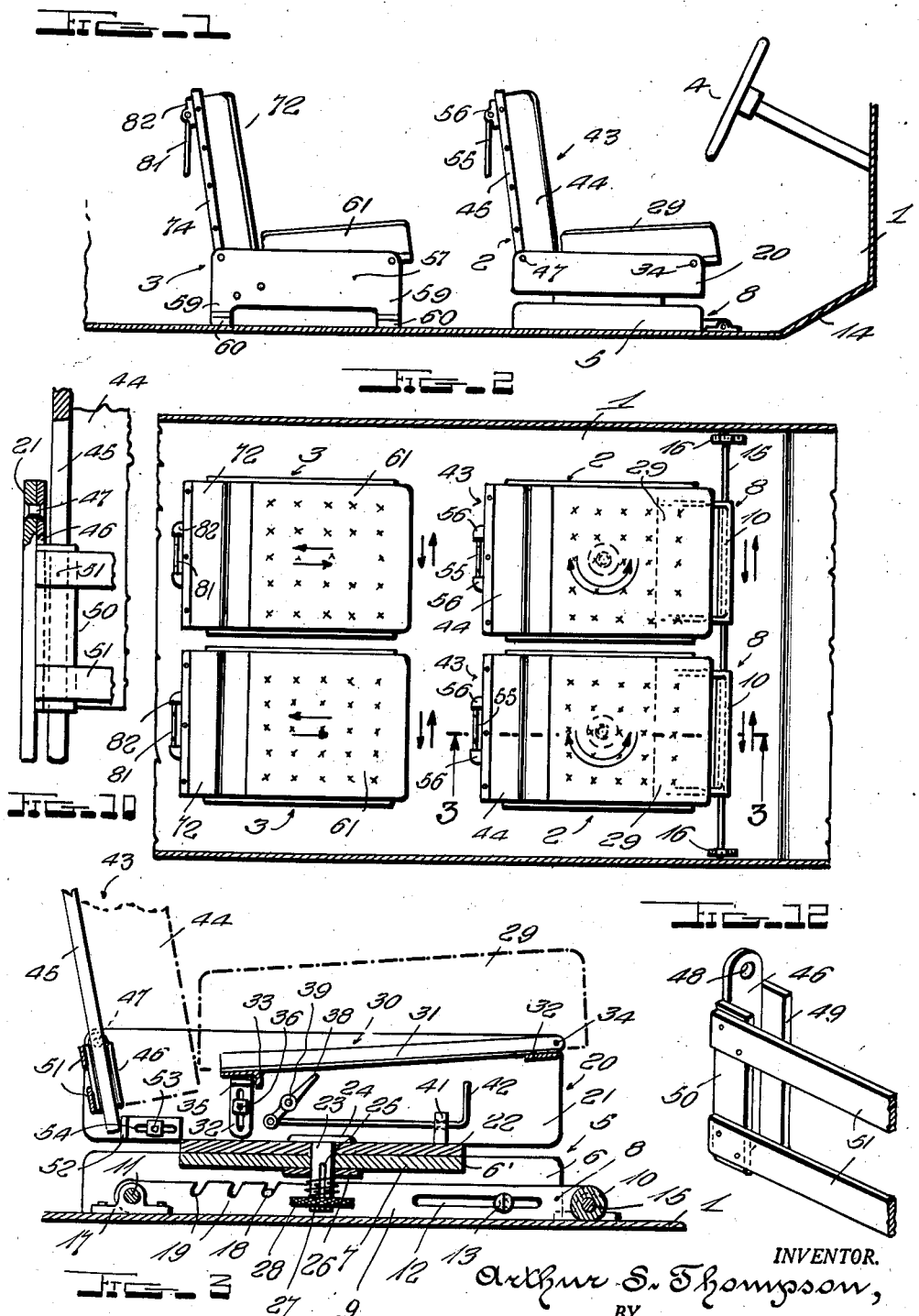
INVENTOR.
Arthur S. Thompson,
BY
Ross J. Woodward.
Attorney

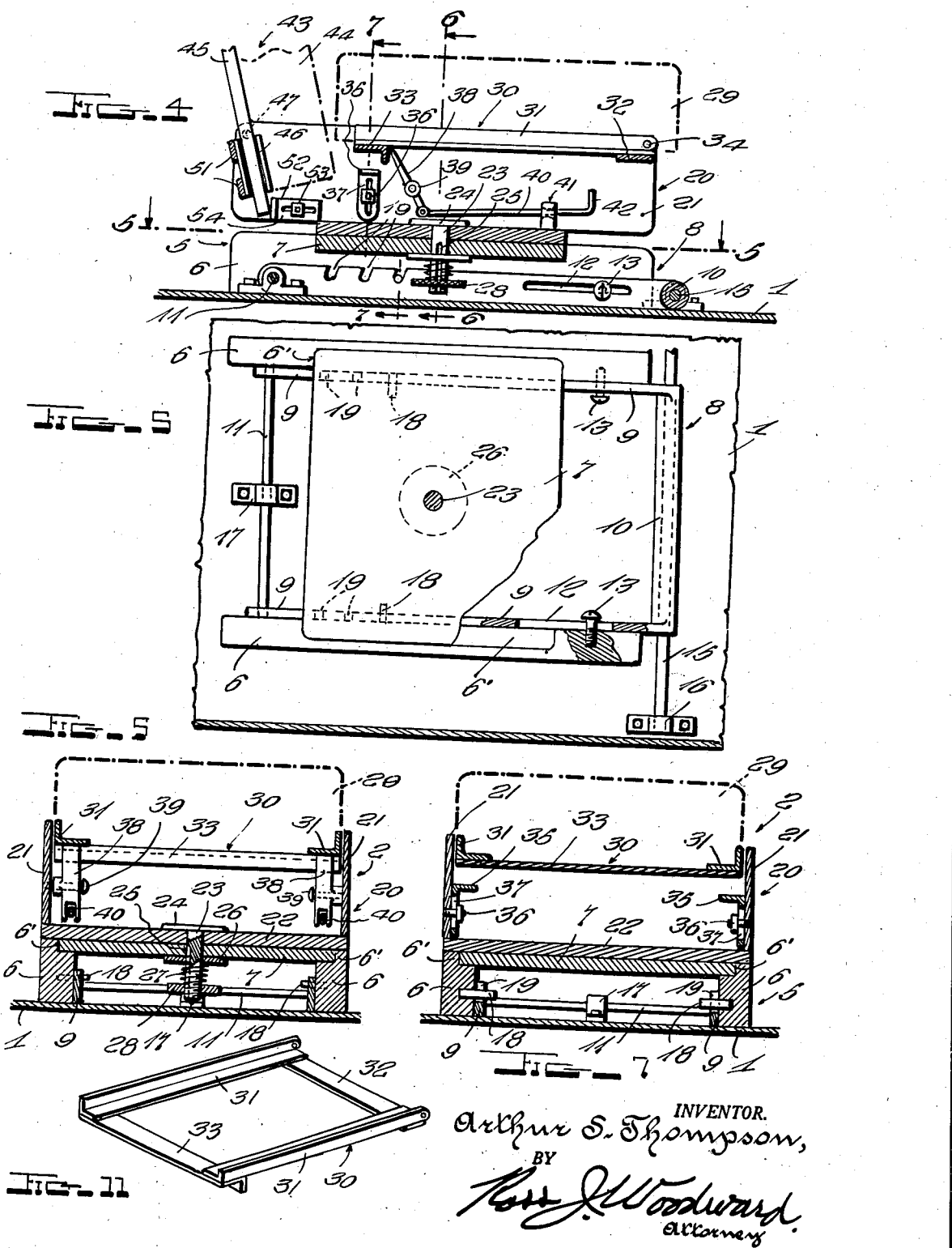

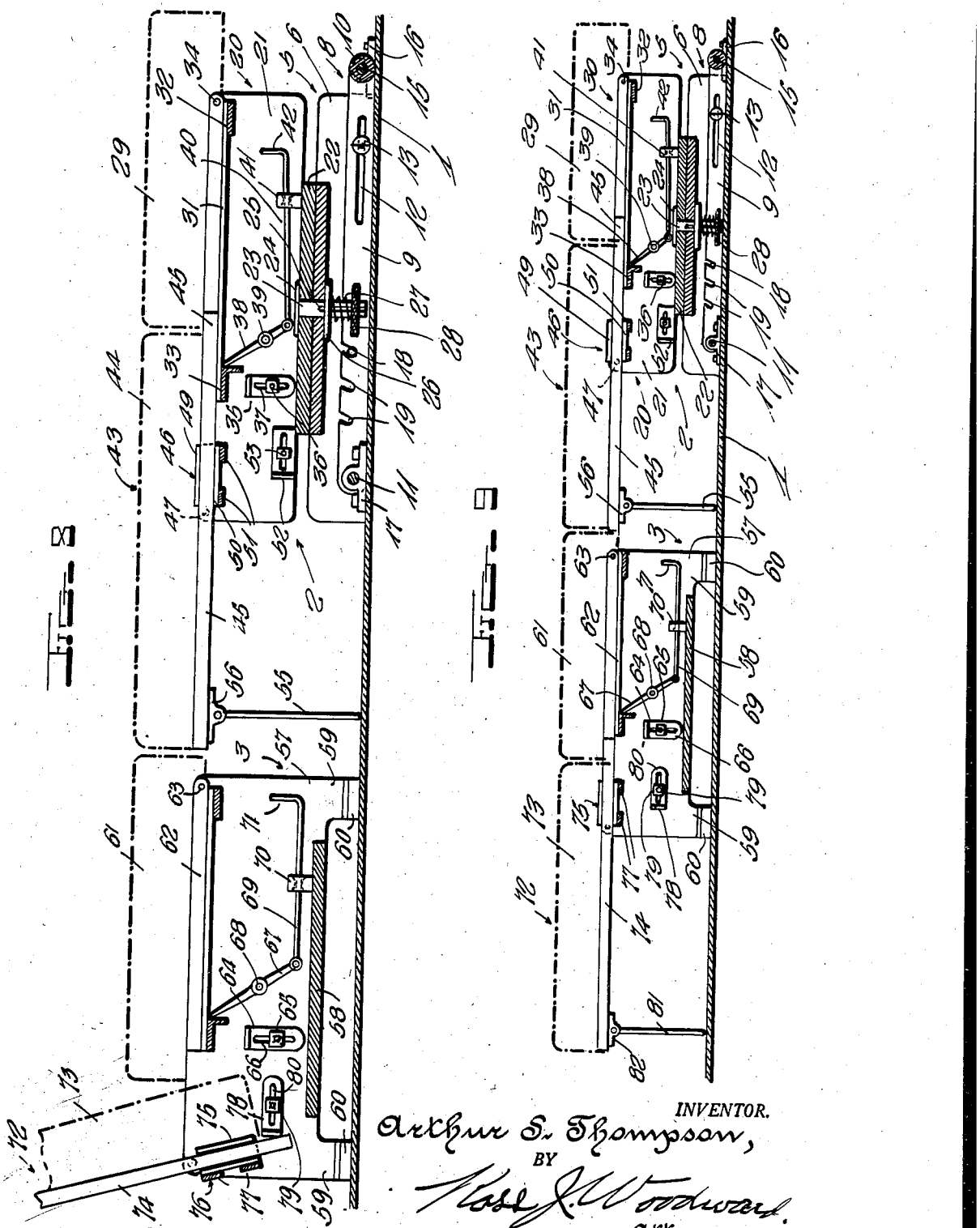

Patented Sept. 29, 1942

2,297,176

UNITED STATES PATENT OFFICE 2,297,176

COMBINED AUTOMOBILE CHAIR AND BED

Arthur S. Thompson, Ontario, Calif.

Application August 4, 1941, Serial No. 405,414

6 Claims. (Cl. 155—7)

This invention relates to automobile chairs and it is one object of the invention to provide the automobile with chairs of such construction that they may be converted into a bed and thus permit a person to travel long distances by motor vehicle without stopping at hotels or tourist camps, the front and rear chairs being so arranged that they may be converted into a double bed or only one set of chairs converted into a single bed.

Another object of the invention is to provide the automobile with front chairs of such construction that they may be turned and disposed in facing relation to the rear chairs, thus permitting occupants of the vehicle to face each other and also permit a table to be disposed in position for use between the front and rear chairs.

Another object of the invention is to provide an automobile with convertible chairs which will be adjustable for leg length and thus provide chairs which will be very comfortable.

Another object of the invention is to so construct and mount the chairs that they may be shifted transversely and thus permit the chairs to be turned easily.

Another object of the invention is to provide chairs having cushion-carrying frames adapted to be tilted and dispose the cushions at such an angle that they will be comfortable.

Another object of the invention is to provide the automobile with chairs which are neat in appearance, very comfortable, and simple in construction.

The invention is illustrated in the accompanying drawings, wherein:

Fig. 1 is a view showing the improved chairs in side elevation.

Fig. 2 is a view showing a portion of an automobile body and chairs of the improved construction in top plan.

Fig. 3 is a sectional view taken longitudinally through one of the front chairs on the line 3—3 of Fig. 2.

Fig. 4 is a view similar to Fig. 3, showing the cushion-supporting frame in a raised position.

Fig. 5 is a view on the line 5—5 of Fig. 4.

Fig. 6 is a transverse sectional view on the line 6—6 of Fig. 4.

Fig. 7 is a sectional view on the line 7—7 of Fig. 4.

Fig. 8 is a longitudinal sectional view showing the back of the front seat in a lowered position and the back of the rear seat in its raised position.

Fig. 9 is a view similar to Fig. 8, showing the backs of both the front seat and the rear seat lowered.

Fig. 10 is a fragmentary view of the back of one chair.

Fig. 11 is a perspective view of a cushion-carrying frame.

Fig. 12 is a perspective view of a portion of the back frame.

The automobile in which the improved seats are mounted is of conventional construction and has a body 1 in which the front seats 2 and the rear seats 3 are mounted, one of the front seats being located back of the steering wheel 4 and constituting the driver's seat. The front seats are of duplicate construction as are also the rear seats, and normally face the front of the automobile with their backs in the raised position shown in Figs. 1 and 2.

Each of the front seats has a base 5 consisting of side members 6 and a cross member or bridge 7 which is countersunk in grooves or recesses 6' along inner side edges of the side members and firmly secured in the recesses in any suitable manner. This base straddles a frame 8 having side bars 9 and front and rear cross bars 10 and 11, the side bars being formed with longitudinally extending slots 12 to receive screws 13 carried by the side members 6 of the base and thus mount the base for longitudinal adjustment to positions which will permit the occupant of the seat to place his feet on the footboard 14 of the automobile body or upon the pedals for actuating the brake and clutch. The front bar 10 is of tubular formation and slidably mounted on a rod or bar 15 carried by brackets 16 which are bolted to the floor of the automobile body and the rear cross bar 11 is slidably engaged through a bracket 17 bolted to the floor. Therefore, the base frame 8 and the base 5 may be shifted transversely of the automobile body to dispose the seat in a convenient position, and also shifted transversely when the seat is to be turned toward the rear instead of toward the front of the vehicle. In order to hold the base in adjusted position longitudinally of the automobile, the side members 6 carry pins 18 which project inwardly therefrom for engagement in selected ones of the notches 19 formed in the side bars 9 of the base frame 8. The base is tilted vertically to move the pins out of the notches when the base is to be shifted longitudinally and returned to lowered position, in which position it rests on the floor and the pins engage in another set of notches and firmly hold the base against sliding longitudinally upon the floor.

The seat 20 of the chair has side rails or sheets 21 which are secured on side edge portions of a cross plate or bridge 22 which rests on the bridge 7 and carries a pivot pin 23 which has a large flat head 24 resting on the upper face of the bridge or cross plate 22. The pivot pin is formed with a longitudinally extending groove 25 so that the washer 26 may be keyed to the pivot and prevented from turning about the pivot.

This washer is shifted upwardly upon the pivot into close contacting engagement with the under face of the bridge 7 by a spring 27 which rests on the nut 28 threaded on the lower end portion of the pivot pin. When this nut is tightened, it compresses the spring to tension the same and the spring exerts downward thrust on the nut and upward thrust upon the washer. Therefore, the bridges 7 and 22 will be gripped between the washer and the head of the pivot pin and the seat will be frictionally held against turning out of a position facing the front of the automobile.

The cushion 29 rests upon a cushion-carrying frame 30 which is formed of metal and has side bars 31 and front and rear cross bars 32 and 33. Front ends of the side bars are pivoted to the side panels 21 by pins 34 and the rear cross bar 33 rests upon brackets 35 which are disposed vertically against inner faces of the side panels and secured by bolts 36 which pass through slots 37 so that the brackets may be vertically adjusted and support the seat at a desired angle. By loosening the bolts and shifting the brackets vertically, the angle of the seat may be adjusted so that it will be comfortable to the person occupying the same.

The seat should have its upper surface level when the chair is transformed into a bed structure and to do this there have been provided lever arms 38 which are pivoted to the side panels 21 by pins 39 and normally disposed at the forward incline shown in Fig. 3, in which position they are out of engagement with the side bars of the cushion carrying frame. Rods 40 are pivoted at their rear ends to lower ends of the levers 38 and extend forwardly through the guide brackets 41 with their front end portions bent upwardly to form handles by means of which the rods are to be grasped and pull exerted to shift the rods forwardly and tilt the levers about their pivots 39 to the rearwardly inclined position of Fig. 4, wherein they engage under faces of the side bars 31 and support the cushion carrying frame in its raised position. The fact that upper ends of the lever arms abut the rear cross bar when in the rearwardly inclined position, limits their rearward tilting movement and prevents the frame 30 from returning to its lowered position on the brackets 35 until the levers have been returned to the forwardly inclined position.

The back 43 of the chair or seat has a cushion 44 which is of upholstered construction and has side bars 45 which project downwardly beyond the cushion 44 and are slidably and removably mounted in the hanger brackets 46. These hanger brackets are pivoted to the side panels 21 by rivets 47 passing through openings 48 formed in their upper ends and have front and rear flanges 49 and 50 between which the side bars of the back fit with their lower ends projecting from the hangers. Cross bars 51 extend between the hangers with their ends secured to the rear flanges 50 and, together with the hangers, form a cradle for supporting the lower portion of the back. Abutment brackets 52 are secured against inner faces of the side panels 21 by bolts 53 which pass through slots 54 formed longitudinally in the brackets, and from an inspection of Figs. 3 and 4, it will be readily seen that by loosening the bolts and adjusting the brackets longitudinally, the incline of the back may be controlled. When the back is to be lowered, it is first drawn upwardly until lower ends of the bars 45 clear the brackets and then swung rearwardly to the lowered position, in which it extends horizontally and is supported in this reclining position by a prop 55 which is pivotally mounted by bearing brackets 56 carried by the back. During its movement to reclining position, the back is shifted forwardly through the hangers so that forward portions of its side bars 45 rest on the side bars 31 of the cushion carrying frame 30 of the seat, the cushion of the seat being shifted forwardly to provide room for the back upon the frame 30. The cushion and the lowered back of the front chair or seat will then form the forward portion of a bed, the rear portion of the bed being formed by the cushion and the lowered back of the companion rear seat or chair.

Each rear chair or seat has a frame provided with side members 57 and a cross panel 58, the side members being formed with legs or feet 59 carrying rubber pads 60 which frictionally grip the floor of the automobile body and prevent the rear chair from slipping out of proper position. The rear chair is not bolted or otherwise fixed to the floor of the automobile but may be shifted about as desired.

The cushion 61 of the rear chair rests on a cushion-supporting frame 62 which is of the same construction as the front cushion-supporting frame 30 and has side bars pivotally connected at their front ends to the side panels 57 by pivots 63. The rear end of the frame 62 is normally supported at a desired angle by brackets 64 which are mounted for vertical adjustment by bolts 65 carried by the side panels and passing through slots 66 in the brackets. The rear frame 62 and the cushion carried thereby are supported horizontally in the same manner as the front cushion-carrying frame 30, through the medium of lever arms 67 which are mounted against inner side faces of the side panels by pivots 68 and have their lower ends pivoted to rods. The rods 69 extend forwardly through bearing brackets 70 and have their front end portions bent to form handles 71 so that the rods may be grasped and drawn forwardly to swing the lever arms to the position shown in Figs. 8 and 9 and support the cushion 61 level with the cushion 43.

The back 72 of the rear chair is similar in construction to the back of the front chair and has a cushion 73 and side bars 74 which are mounted in the hangers 75 of a frame or cradle 76, the hangers being pivoted at their upper ends to the side panels 57 and connected by cross bars 77 which have their ends secured to rear flanges of the hangers. When the back 72 is in raised position, the side bars extend downwardly for abutting engagement with brackets 78, as shown in Fig. 8. These brackets correspond to the brackets 52 and are adjustably secured to the side panels 57 by bolts 79 which pass through slots 80 in the brackets and mount the brackets for longitudinal adjustment so that the angle assumed by the back may be controlled. When the back is moved to lowered position, it is shifted upwardly and then tilted downwardly to the position shown in Fig. 9, where it is supported in a horizontal position by a prop 81 with the cushion 72 level with the cushion 61 and the side bars extending forwardly and resting on side bars of the frame 62 and the cushion 61 shifted forwardly to a position in close proximity to the rear end of the lowered back 43 of the front seat or chair. The prop 81 is pivoted in brackets 82 so that it may be disposed close to the chair back when the chair back is in raised position.

Chairs or seats of the improved construction will be found very comfortable and convenient. The front seats are individual seats and each may be shifted forwardly or rearwardly to a position accommodating it to the leg length of a person occupying it. The rear chairs may also be shifted forwardly or rearwardly as desired, and both the front and rear chairs shifted transversely of the automobile to desired position. The seats 29 and 61 may be angularly adjusted by proper adjustment of the brackets 35 and 64 upon which the rear ends of their supporting frames rest, and by adjusting the brackets 52 and 78, the backs 43 and 72 may be disposed at an angle which will be comfortable. In view of the fact that the front chairs are pivoted to their bases 5, they may be turned to extend diagonally or to a position in which they face the rear of the automobile instead of forwardly, and a table may be set up between front and rear seats for use when eating meals during a journey. When it is desired to sleep in the automobile, the backs of the front and rear chairs are lowered to form a bed which may be a double bed or a single bed, according to whether both front and rear seats have their backs lowered, or just the backs of one set of front and rear seats. If it is desired to form a short bed for a small child, the back of the rear seat or seats may be left raised, as shown in Fig. 8. It will thus be seen that the automobile may be used for traveling and also as sleeping quarters.

Having thus described the invention, what is claimed is:

1. In a vehicle, a body, and front and rear chairs in the body, each chair having a cushion-supporting frame pivoted at its front for angular adjustment, means for supporting the frame in angularly adjusted position, a back-supporting cradle pivotally mounted for tilting about a horizontal axis, a back carried by said cradle and tiltable therewith from a raised position to a reclining position, the back being slidable through the cradle and when in lowered position having its forward portion supported on the cushion-supporting frame, and means for holding the back in angularly adjusted position when in raised position.

2. A vehicle chair comprising a seat having side panels, a cushion supporting frame between the side panels pivoted at its front to the side panels, brackets for supporting the rear end of said frame carried by the side panels and shiftable vertically to support the frame at a desired angle, a cushion resting on said frame and shiftable longitudinally thereon, a cradle extending between rear ends of the panels and pivoted for tilting about a horizontal axis to angularly adjusted positions, a back having bars engaged with said cradle with end portions projecting from the cradle, abutment brackets carried by the side panels for engaging the projecting end portions of the bars and holding the back in angularly adjusted position, and means for supporting the back when the back and the cradle are swung to a reclining position, said back being shiftable through the cradle to dispose the projecting end portions of the bars in position upon the rear portion of the cushion supporting frame when the back is in the reclining position.

3. A vehicle chair comprising a seat having side panels, a cushion-supporting frame between the side panels pivoted at its front end for vertical tilting about a horizontal axis to angularly adjusted positions, means for supporting the frame in a predetermined angularly adjusted position, lever arms pivoted to the side panels and having upper ends engaging the cushion-supporting frame, rods pivoted to lower ends of the lever arms and extending forwardly of the seat and mounted for longitudinal sliding movement, said rods having handles at their front ends adapting them to be grasped and shifted longitudinally to tilt the lever arms about their pivots and move the cushion-carrying frame to a raised position and support the raised frame, a cushion resting on said frame, and a back for the chair mounted for tilting movement from a raised position to a reclining position.

4. A vehicle chair comprising a seat having side panels, a cushion-supporting frame between the side panels pivoted at its front end for vertical tilting about a horizontal axis to angularly adjusted positions, means for supporting the frame in a predetermined angularly adjusted position, means for tilting the frame to a substantially horizontal position and supporting the frame in the horizontal position, a cradle extending between rear end portions of the panels and pivotally mounted for tilting movement from a raised position to a reclining position, a back carried by the cradle and shiftable therein to a position disposing its front end upon the rear portion of the frame when the back and the cradle are in a reclining position, means for supporting the rear end of the back when in a reclining position, and means for holding the back at a predetermined angle when raised.

5. A vehicle chair comprising a seat and a back, the seat including a cushion-carrying frame tiltable vertically to angularly adjusted positions, a cushion resting on said frame and shiftable longitudinally thereon to a position disposing its rear end in forwardly spaced relation to the rear end of the frame, the back being mounted for tilting movement from a raised position to a lowered reclining position and when lowered being shiftable forwardly to dispose its front end upon the rear end portion of the cushion-supporting frame, and means for supporting the rear end of the back when lowered.

6. A vehicle chair comprising a seat having side panels, a cradle extending transversely of the chair between rear end portions of the side panels and consisting of hangers pivoted at their upper ends to inner faces of the side panels and cross strips, the hangers having front and rear flanges and the cross strips being secured to rear faces of the rear flanges, a back for the chair having side bars engaged in the hangers between the front and rear flanges thereof with their lower portions projecting from the hangers, and abutment brackets carried by the side panels and shiftable longitudinally thereof into position for engaging lower ends of the side bars and holding the back at a predetermined angle, the side bars being shiftable longitudinally through the hangers out of engagement with the brackets to permit tilting of the back to a reclining position.

ARTHUR S. THOMPSON.